United States Patent
Kimura et al.

(10) Patent No.: US 9,685,199 B2
(45) Date of Patent: Jun. 20, 2017

(54) EDITING APPARATUS AND EDITING METHOD

(71) Applicant: OLYMPUS CORPORATION, Hachioji-shi, Tokyo (JP)

(72) Inventors: Keinosuke Kimura, Akiruno (JP); Katsuhisa Kawaguchi, Atsugi (JP); Osamu Nonaka, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/874,683

(22) Filed: Oct. 5, 2015

(65) Prior Publication Data

US 2016/0180882 A1    Jun. 23, 2016

(30) Foreign Application Priority Data

Dec. 22, 2014 (JP) ................. 2014-258921

(51) Int. Cl.
  *G11B 27/34* (2006.01)
  *G11B 27/28* (2006.01)

(52) U.S. Cl.
  CPC ............. *G11B 27/34* (2013.01); *G11B 27/28* (2013.01)

(58) Field of Classification Search
  None
  See application file for complete search history.

(56) References Cited

U.S. PATENT DOCUMENTS

| | | | | |
|---|---|---|---|---|
| 2010/0281375 | A1* | 11/2010 | Pendergast | G11B 27/034 715/723 |
| 2012/0245936 | A1* | 9/2012 | Treglia | G06F 17/30746 704/235 |
| 2013/0262527 | A1* | 10/2013 | Hunter | G06F 3/0484 707/805 |
| 2014/0304606 | A1* | 10/2014 | Ohmura | G06F 3/167 715/728 |

FOREIGN PATENT DOCUMENTS

| | | |
|---|---|---|
| JP | 2013-183259 A | 9/2013 |
| JP | 2014-017852 A | 1/2014 |

* cited by examiner

*Primary Examiner* — Eileen Adams
(74) *Attorney, Agent, or Firm* — Volpe and Koenig, P.C.

(57) ABSTRACT

An editing apparatus includes an image analyzing section that analyzes a recorded video, a sound analyzing section that analyzes recorded sound, and a display control section that displays, on a display section, on the basis of an analysis result of the image analyzing section, a video bar indicator corresponding to a reproduction time of the recorded video and displays, on the display section, on the basis of an analysis result of the sound analyzing section, a sound bar indicator corresponding to a reproduction time of the recorded sound, the sound bar indicator having a time per unit length same as a time per unit length of the video bar indicator. The editing apparatus facilitates editing combination work for the video and the sound by arranging and displaying the video and the sound on time axes of the same scale.

10 Claims, 9 Drawing Sheets

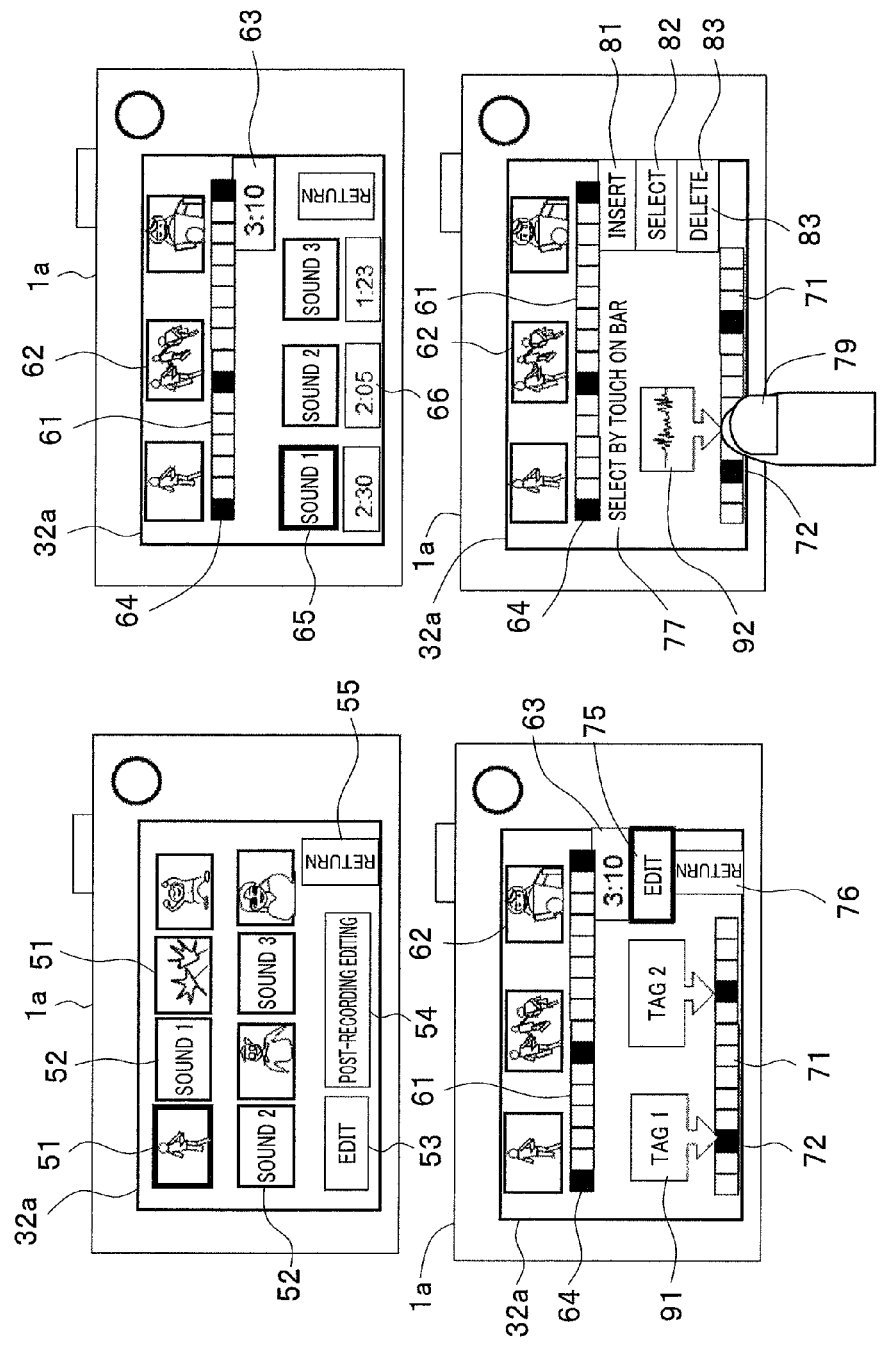

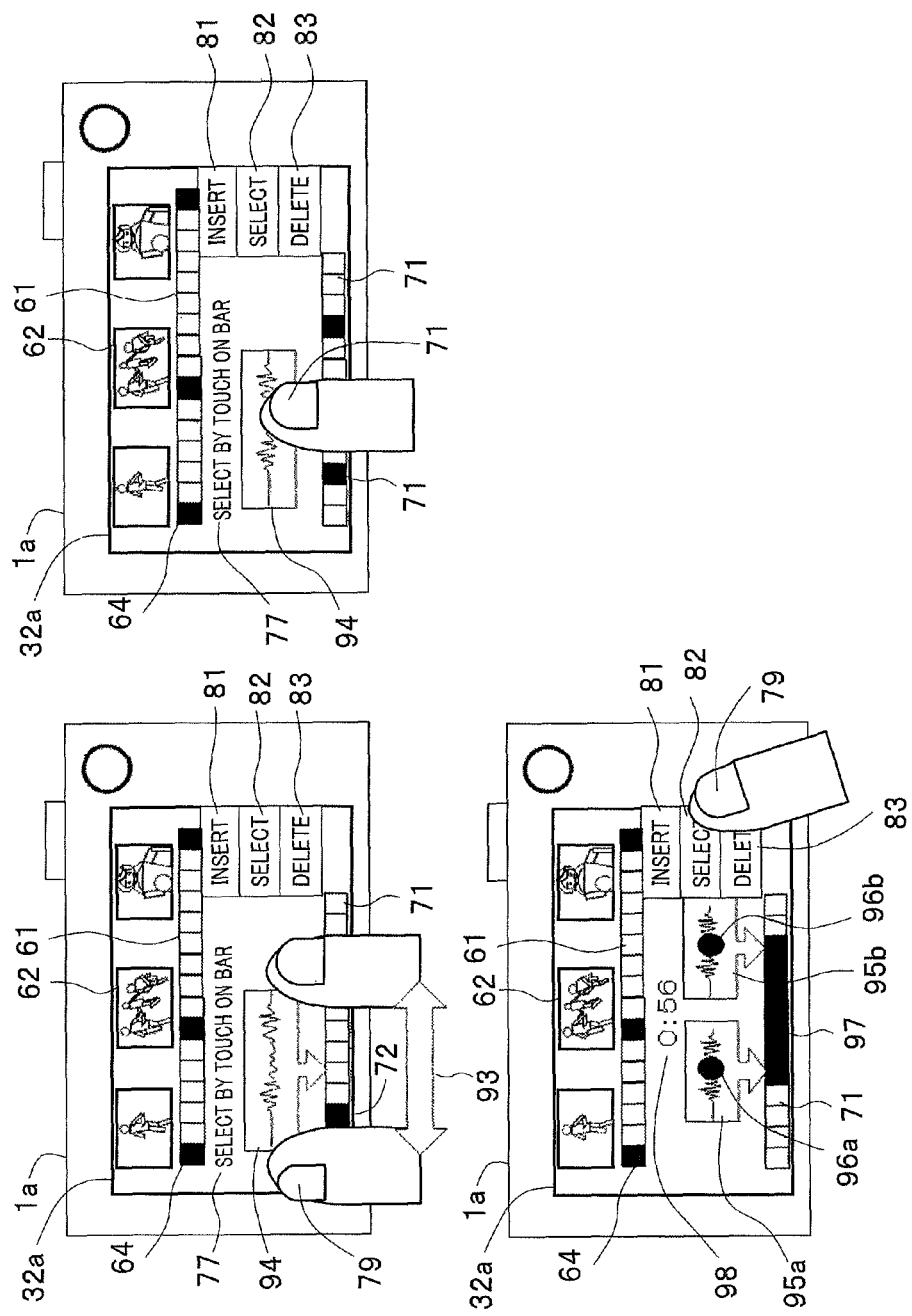

EDITING APPARATUS AND EDITING METHOD

This application claim is benefit of Japanese Application No. 2014-258921 filed in Japan on Dec. 22, 2014, the contents of which are incorporated by this reference.

BACKGROUND OF THE INVENTION

1. Field of the Invention

The present invention relates to an editing apparatus and an editing method for subjecting a video and sound to combination processing.

2. Description of the Related Art

In production of video contents, a method of separately recording a video and sound and combining the video and the sound has sometimes been adopted. Post-recording for later combining sound with a video photographed earlier and pre-recording for later combining a video with sound collected earlier have sometimes been performed. In the following explanation, processing of the post-recording and the pre-recording is referred to as additional combination processing for a video or sound.

An editing apparatus that performs the additional combination processing for a video or sound can combine sound suitable for a video or combine a video suitable for sound even when sound suitable for a video cannot be collected during video photographing or when a video suitable for sound cannot be photographed during sound collection. The editing apparatus can combine a video and sound unrelated to sound and a video and can improve a value of video contents.

For example, Japanese Patent Application Laid-Open Publication No. 2014-17852 discloses an apparatus that combines imitation sound or a picture corresponding to an image with the image.

In this way, the editing apparatus can separately acquire videos and sound and edit and additionally combine the acquired videos and sound. In this case, the editing apparatus can visually recognize timing for combining the sound by arranging the videos on a time axis in the order of photographing time. For example, the apparatus disclosed in Japanese Patent Application Laid-Open Publication No. 2014-17852 adds an index to a part of sections of a movie and displays a temporal change of the movie as a bar.

SUMMARY OF THE INVENTION

An editing apparatus according to the present invention includes: an image analyzing section that analyzes a recorded video; a sound analyzing section that analyzes recorded sound; and a display control section that displays, on a display section, on the basis of an analysis result of the image analyzing section, a video bar indicator corresponding to a reproduction time of the recorded video and displays, on the display section, on the basis of an analysis result of the sound analyzing section, a sound bar indicator corresponding to a reproduction time of the recorded sound, the sound bar indicator having a time per unit length same as a time per unit length of the video bar indicator.

An editing method according to the present invention includes: analyzing a recorded video; analyzing recorded sound; and displaying, on a display section, on the basis of an analysis result of the recorded video, a video bar indicator corresponding to a reproduction time of the recorded video and displaying, on the display section, on the basis of an analysis result of the recorded sound, a sound bar indicator corresponding to a reproduction time of the recorded sound, the sound bar indicator having a time per unit length same as a time per unit length of the video bar indicator.

The above and other objects, features and advantages of the invention will become more clearly understood from the following description referring to the accompanying drawings.

BRIEF DESCRIPTION OF THE DRAWINGS

FIG. 8 is an explanatory diagram for explaining an additional combination processing screen in a modification; and FIG. 9 is an explanatory diagram for explaining an additional combination processing screen in the modification.

DETAILED DESCRIPTION OF THE PREFERRED EMBODIMENTS

Embodiments of the present invention are explained below in detail with reference to the drawings.

Figure 1:
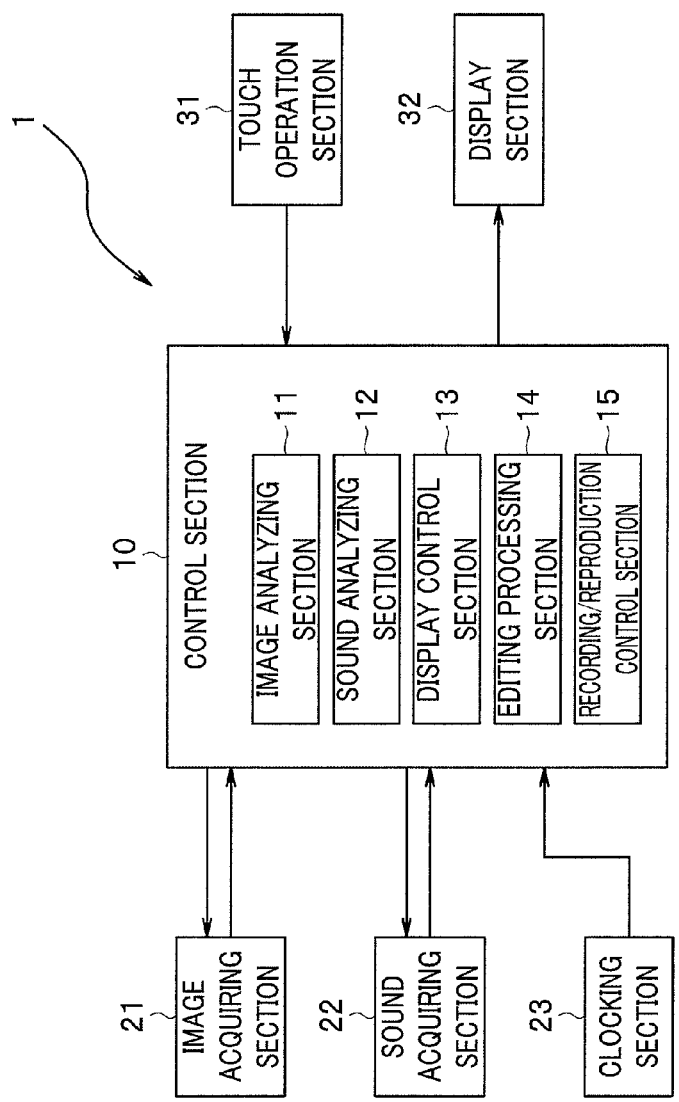
FIG. 1 is a block diagram showing a circuit configuration of an editing apparatus according to an embodiment of the present invention.

FIG. 1 is a block diagram showing a circuit configuration of an editing apparatus according to an embodiment of the present invention. In the present embodiment, in additional combination processing, scales of time axes of a video and sound are matched, a video bar indicator and a sound bar indicator having the same times per unit length, are displayed, and event indicators of a video, sound, and the like corresponding to timings on the respective bar indicators are enabled to be displayed to facilitate work of the additional combination processing of a video and sound.

In FIG. 1, an editing apparatus 1 includes a control section 10. The control section 10 can be configured by a not-shown processor such as a CPU. The control section 10 may operate according to a computer program stored in a not-shown memory and realize a predetermined function.

An image acquiring section 21 acquires a movie and gives the movie to the control section 10. For example, the image acquiring section 21 may be configured by an image pickup section. The image acquiring section 21 may output a picked-up image (moving image) acquired by the image pickup section by performing moving image photographing to the control section 10. A sound acquiring section 22 acquires sound and gives the sound to the control section 10. For example, the sound acquiring section 22 may be configured by a sound collecting section such as a microphone. The sound acquiring section 22 may output sound acquired by the sound collecting section to the control section 10. A clocking section 23 generates time information and outputs the generated time information to the control section 10. In this way, the control section 10 can acquire, according to the inputted time information, the picked-up image from the image acquiring section 21 in association with an image pickup time of the picked-up image. The control section 10 can acquire, according to the inputted time information, sound from the sound acquiring section 22 in association with a collecting time of the sound. The control section 10 can control the image acquiring section 21 and the sound acquiring section 22.

An image analyzing section 11 in the control section 10 executes image analysis processing for the inputted picked-up image and obtains an image analysis result. For example, the image analyzing section 11 performs image determination, scene change determination, and the like and outputs an analysis result of a scene change, an image at scene change timing, and the like as video event information in association with time information. A sound analyzing section 12 performs analysis processing for the inputted sound and obtains a sound analysis result. For example, the sound analyzing section 12 performs a volume analysis, a frequency analysis, sound recognition processing, and the like and outputs an analysis result of the sound as sound event information in association with the time information.

Note that, besides determining a scene change according to a change in the position of a main object, a change in a person himself or herself appearing in a scene, a facial expression, or a pause, and a change in luminance, focus information, and the like, the image analyzing section 11 may classify the scene according a change in a frequency and a level of sound recorded simultaneously and determine the scene change. The sound analyzing section 12 may classify sound characteristics at respective timings using, for example, a separation technique for human voice and noise according to a frequency change and a level change actively researched in recent years.

A display control section 13 executes various kinds of processing concerning display. The display control section 13 can give a collected moving image to a display section 32 and cause the display section 32 to display the moving image. The display section 32 includes a display screen such as an LCD and displays an image given from the display control section 13. The display control section 13 can also cause the display section 32 to display various menu indicators and the like on the display screen. Further, in the present embodiment, the display control section 13 can be controlled by an editing processing section 14 explained below to cause the display section 32 to display various kinds of indicators for work of additional combination processing.

A touch operation section 31 is provided on the display screen of the display section 32. The touch operation section 31 can generate an operation signal corresponding to a position on the display screen pointed by the user with a finger. The operation signal is supplied to the control section 10. Consequently, when a user touches the display screen or slides the finger on the display screen, the control section 10 can detect a touch position of the user, operation for bringing the finger close to and separating the finger from the display screen, slide operation, a position where the finger reaches according to the slide operation, a slide direction, and various kinds of operation in a touching period and the like and can execute processing corresponding to user operation.

A recording/reproduction control section 15 can perform processing concerning recording and reproduction of a picked-up image and collected sound. For example, the recording/reproduction control section 15 can give an image and sound to a not-shown recording medium such as a memory card and cause the recording medium to record the image and the sound. The recording/reproduction control section 15 can also read out and reproduce an image and sound recorded in the recording medium.

A picked-up image and sound are given to an editing processing section 14 from the recording/reproduction control section 15 together with time information. Further, video event information and sound event information are given to the editing processing section 14. When an additional combination processing mode for a video or sound is designated, the editing processing section 14 causes the display control section 13 to display an additional combination processing screen. For example, the editing processing section 14 can cause the display control section 13 to display, as the additional combination processing screen, an operation screen on which a video event indicator corresponding to the video event information and a sound event indicator corresponding to the sound event information are arranged on a common time axis in association with each other. For example, the editing processing section 14 can cause the display control section 13 to display two bar indicators having the same times per unit length, and can cause the display control section 13 to display an indicator in which a video event indicator and a sound event indicator of an image reproduction time and a sound reproduction time corresponding to positions (reproduction positions) on the bar indicators are arranged in the vicinities of positions (reproduction positions) of corresponding times of the respective bar indicators. Note that, when a recorded video and recorded sound are reproduced on a real-time basis, the image reproduction time and the sound reproduction time are respectively the same as a video recording time and a sound collection time.

When a video and sound are selected by the operation of the touch operation section 31, the editing processing section 14 performs additional combination processing for inserting the selected video into sound at time corresponding to the video and inserting the selected sound into a video at time corresponding to the sound. The editing processing section 14 adjusts a time axis of the selected video or sound. For example, the editing processing section 14 adjusts the time axis of the inserted video or sound such that the inserted video or sound fits in a predetermined time width and enables slow or high-speed reproduction. Note that the editing processing section 14 may adjust the time axis of the video or the sound in order to improve a video effect or a sound effect.

Note that the editing apparatus in the present embodiment can be configured by a camera or the like including an image pickup section and a sound collecting section. The editing apparatus in the present embodiment does not need to include the image pickup section and the sound collecting section as long as a picked-up image including information concerning an image pickup time and sound including information concerning a sound collection time can be supplied to the control section 10. The editing apparatus can also be configured by a computer, a tablet PC, a cellular phone, a display apparatus, and the like besides the camera. In these apparatuses, when a video and sound are captured, if time information is already included in video and sound data, the clocking section 23 is unnecessary. However, if the time information is not included, the image and the sound are captured while measuring actual times of an image and sound using time information of the clocking section 23.

Figure 2A:
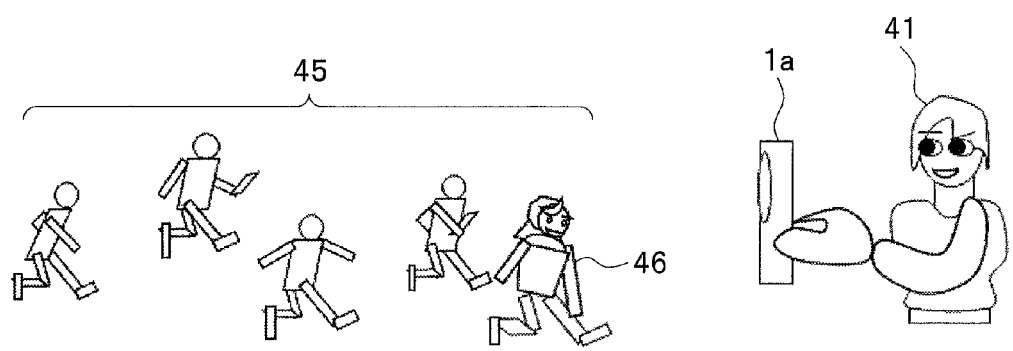
FIGS. 2A and 2B are explanatory diagrams for explaining states of image pickup and sound collection of a video and sound used for additional combination processing.
Figure 2B:
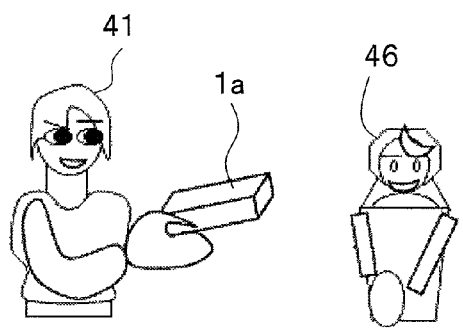
Figure 3:
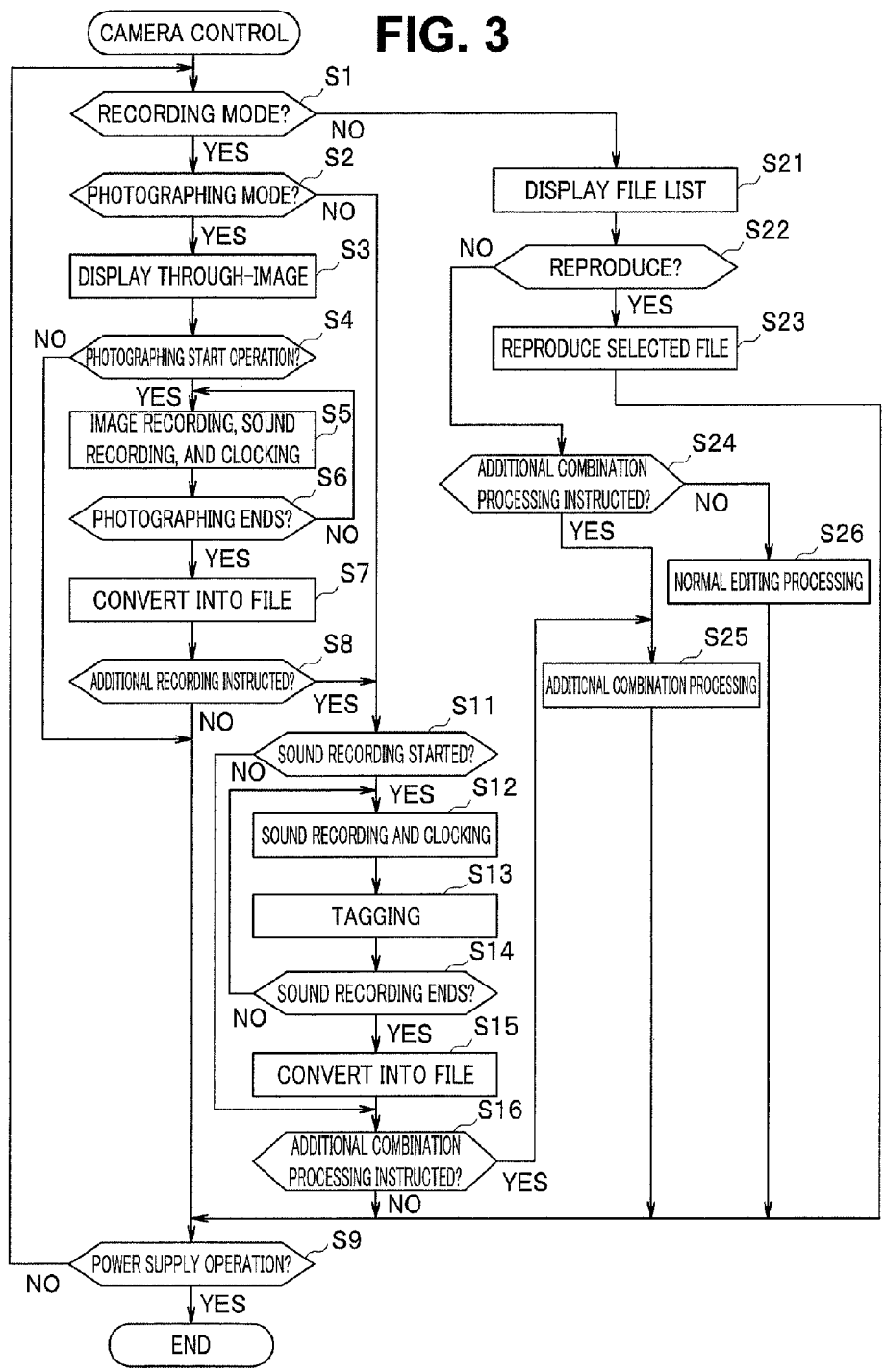
FIG. 3 is a flowchart for explaining camera control.
Figure 4:
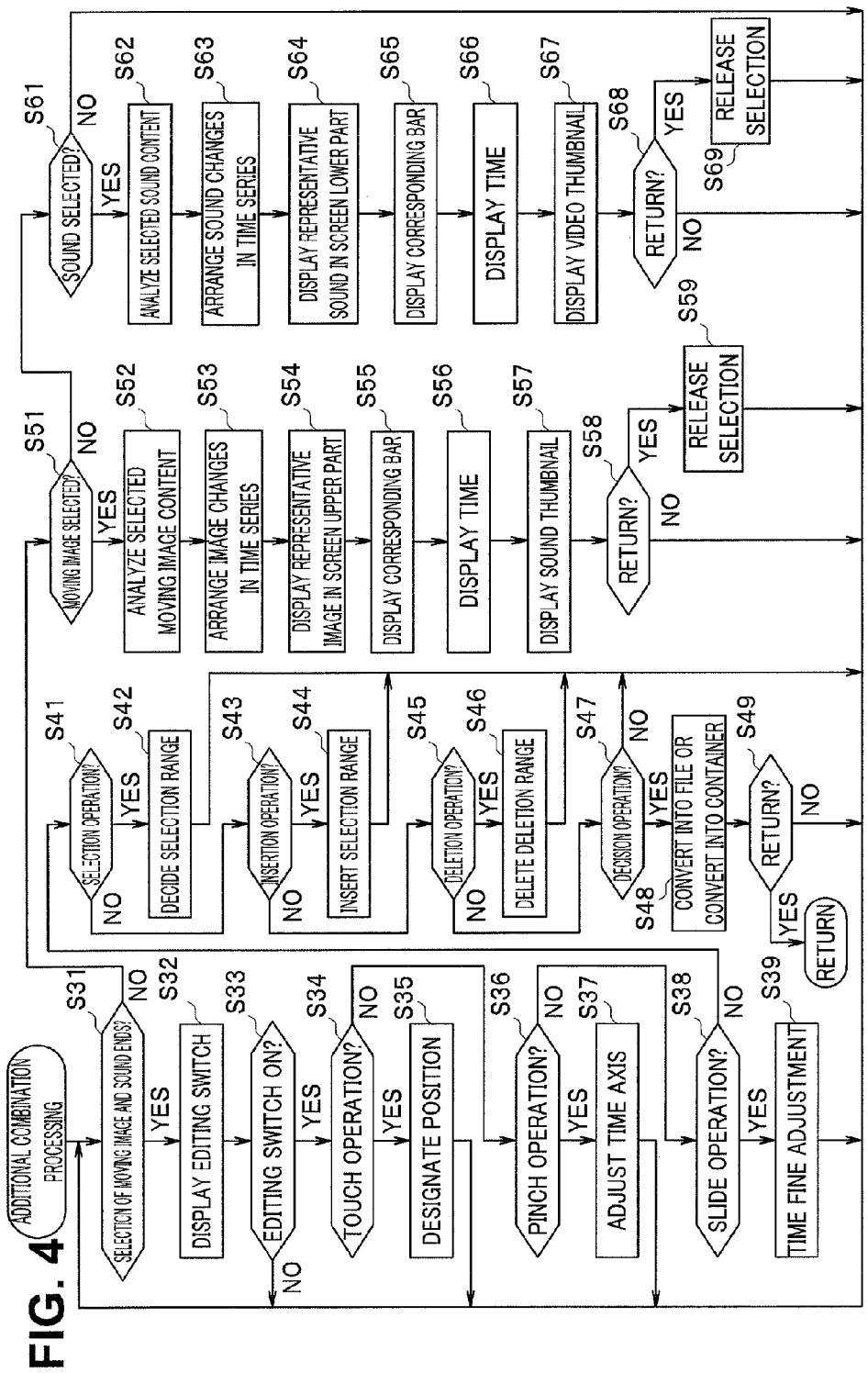
FIG. 4 is a flowchart for explaining additional combination processing in post-recording.
Figure 5:
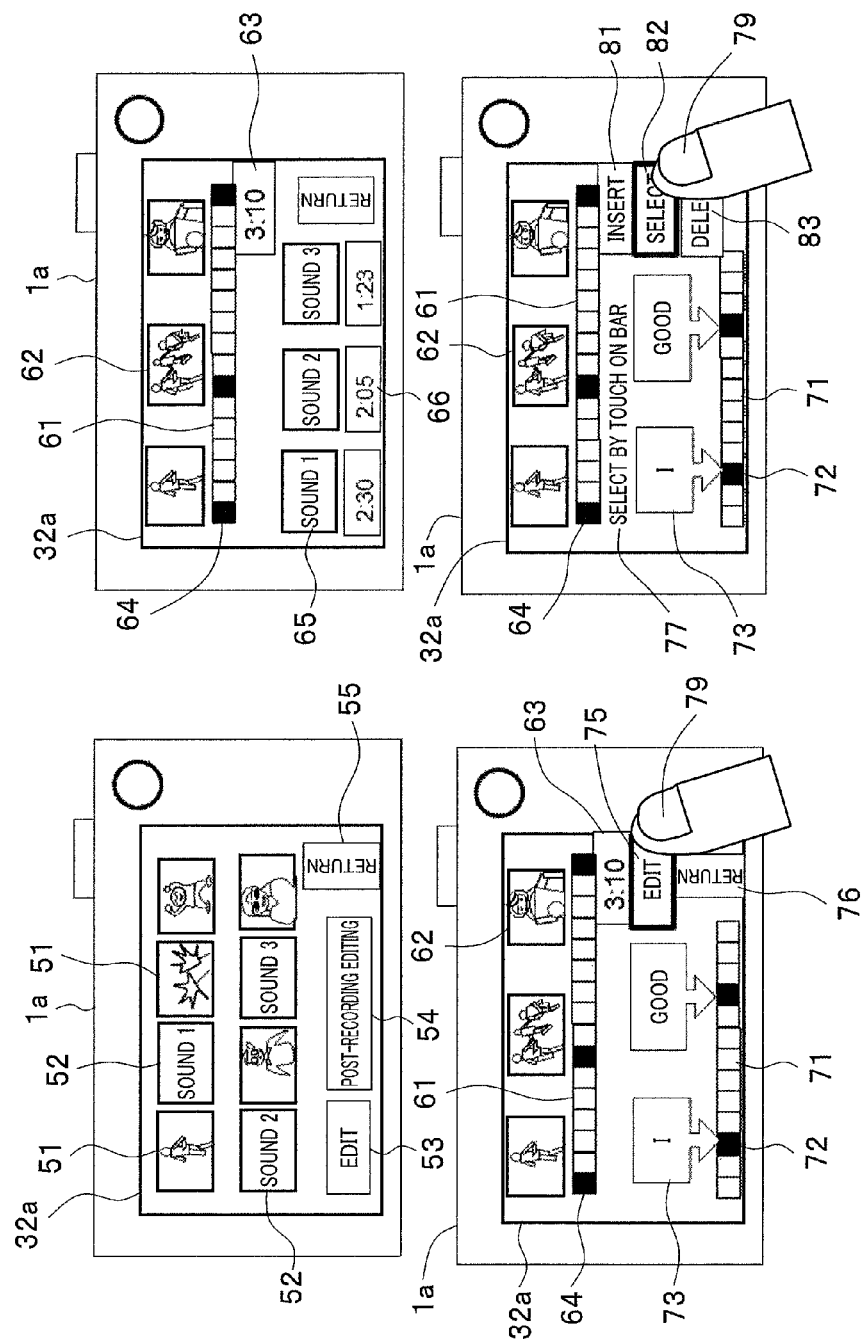
FIG. 5 is an explanatory diagram for explaining an additional combination processing screen.
Figure 6:
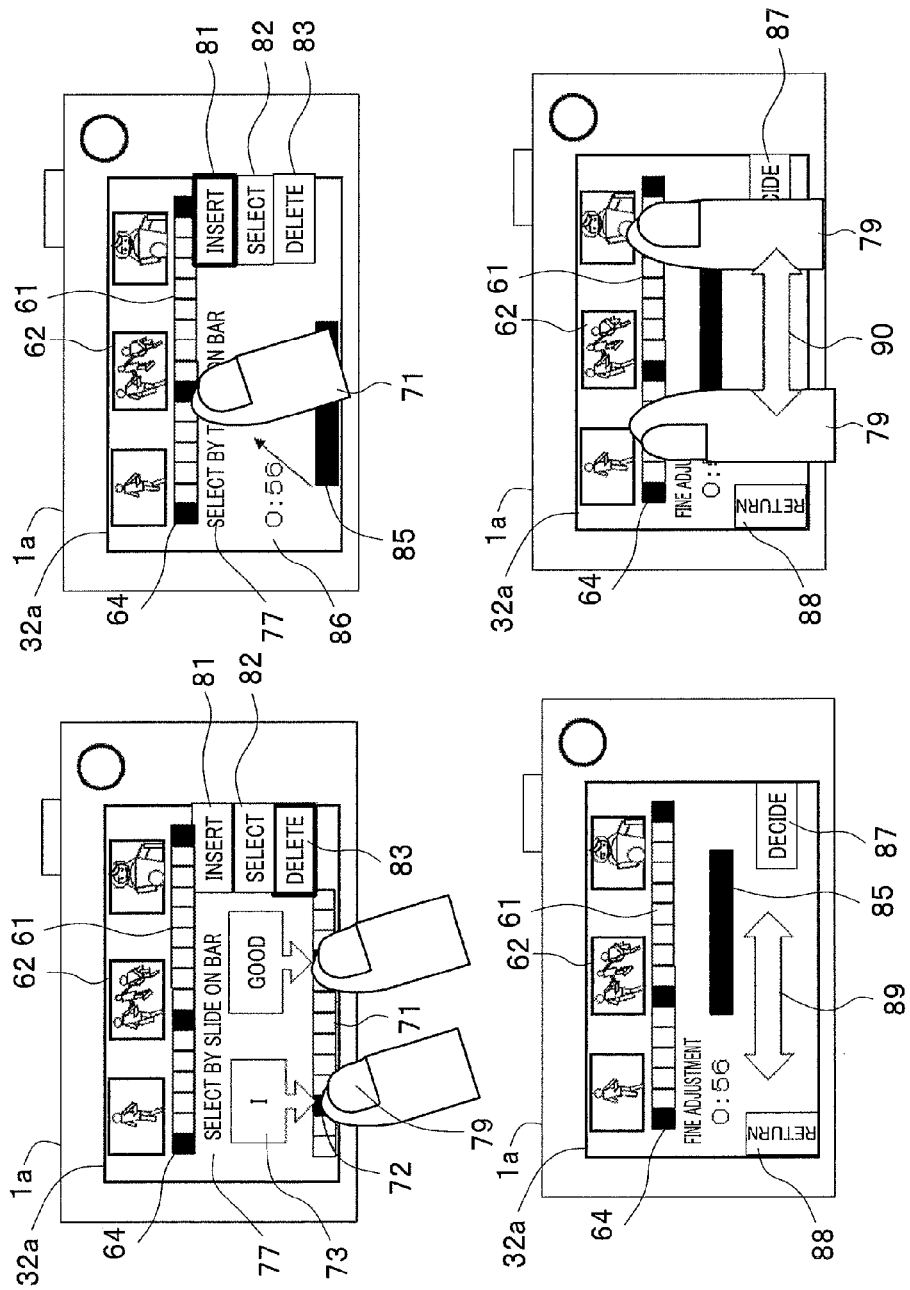
FIG. 6 is an explanatory diagram for explaining the additional combination processing screen.

An operation of the editing apparatus in the present embodiment configured as explained above is explained with reference to FIGS. 2A and 2B to FIG. 6. FIGS. 2A and 2B are explanatory diagrams for explaining states of image pickup and sound collection of a video and sound used for the additional combination processing. FIG. 2A shows the state of the image pickup. FIG. 2B shows the state of the sound collection. FIG. 3 is a flowchart for explaining camera control. FIG. 4 is a flowchart for explaining the additional combination processing in the post-recording. FIGS. 5 and 6 are explanatory diagrams for explaining the additional combination processing screen.

FIGS. 2A and 2B show an example in which the editing apparatus 1 is configured by a camera. FIG. 2A shows a state in which a person 41 photographs an object 45 who is running a race. The person 41 grips a housing 1a incorporating the editing apparatus 1 shown in FIG. 1 and photographs the object 45 including a person 46 with the image pickup section configuring the image acquiring section 21. FIG. 2B shows a state in which the person 41 records conversation of the person 46. The person 41 grips the housing 1a and records the conversation of the person with the sound collecting section configuring the sound acquiring section 22. Note that the video recording and the sound recording may be performed by an apparatus other than the editing apparatus 1.

As shown in FIGS. 2A and 2B, the additional combination processing for a video or sound is processing for combining videos and sound recorded at timings and in places different from each other. When the editing apparatus 1 is configured by the camera and the like, the additional combination processing is also possible immediately after the photographing, during reproduction, and the like.

FIG. 3 shows camera control performed when the editing apparatus 1 is configured by the camera. In step S1 in FIG. 3, the control section 10 determines whether or not the editing apparatus 1 is in a recording mode. It is assumed that the recording mode is designated. In this case, in step S2, the control section 10 determines whether or not the editing apparatus 1 is in a photographing mode. It is assumed that the photographing mode is designated. In this case, in step S3, the control section 10 controls the image acquiring section 21 to start image pickup and captures a picked-up image from the image acquiring section 21. The control section 10 gives the captured picked-up image (a moving image) to the display section 32 and causes the display section 32 to display a through-image (step S3).

Subsequently, in step S4, the control section 10 determines whether or not a start of moving image recording is instructed. When user operation for causing the image acquiring section 21 to start the moving image recording is performed, in step S5, the control section 10 captures a moving image from the image acquiring section 21 and captures sound from the sound acquiring section 22 and performs recording with the recording/reproduction control section 15.

In the next step S6, the control section 10 determines whether or not end operation for the moving image recording is performed. The control section 10 continues the video recording and the sound recording until the end operation is performed (step S5). When the end operation is performed, in step S7, the control section 10 converts the moving image and the sound recorded in step S7 into a file. Note that, in step S5, it is assumed that the video recording and the sound recording are simultaneously performed. However, the control section 10 may perform only the video recording or the sound recording.

In the next step S8, the control section 10 determines whether or not additional sound recording is instructed. When the additional sound recording is not instructed, in step S9, the control section 10 determines whether or not power-off operation is performed. When the power-off operation is performed, the control section 10 ends the processing. When the power-off operation is not performed, the control section 10 returns the processing to step S1.

It is assumed that instruction operation for the additional sound recording by the user is detected in step S8. In this case, the control section 10 shifts the processing to step S11 and starts sound recording. The control section 10 captures, together with time information, sound collected by the sound acquiring section 22 (step S12). In the capturing, when tagging (marking) operation by the user is performed, the editing processing section 14 controls the recording/reproduction control section 15 to tag the sound and then record the sound (step S13).

In the next step S14, the control section 10 determines whether or not end operation for the sound recording is performed. The control section 10 continues the sound recording and the tagging until the end operation is performed (steps S12 and S13). When the end operation is performed, in step S15, the control section 10 converts the recorded sound into a file. Note that an example is explained above in which the additional recording of sound is performed in steps S11 to S15 in FIG. 3. However, a moving image may be additionally photographed according to additional photographing operation by the user.

In step S16, the control section 10 determines whether or not additional combination processing for post-recording or pre-recording is instructed. When the additional combination processing is not instructed, the control section 10 shifts the processing to step S9. When the additional combination processing is instructed, the control section 10 shifts the processing to step S25. The additional combination processing in step S25 is explained below.

When determining in step S1 that the editing apparatus 1 is not in the recording mode, the control section 10 shifts the processing to a reproduction mode in step S21 and subsequent steps. The recording/reproduction control section 15 acquires information concerning images already recorded in the recording medium and gives the information to the display control section 13. The display control section 13 causes the display section 32 to display a file list indicator, which is a list of the recorded images, on the display screen (step S21). In the next step S22, the control section 10 determines whether or not operation for selecting reproduction of an image is performed. When the reproduction of an image is selected, the recording/reproduction control section 15 reproduces the selected image and gives the image to the display control section 13. The display control section 13 displays the reproduced image on the display screen of the display section 32 (step S23).

In the present embodiment, when the reproduction is not instructed in step S22, in step S24, the control section 10 determines whether or not the additional combination processing is instructed. When the additional combination processing is not instructed, the editing processing section 14 executes normal editing processing on the basis of user operation (step S26). When the additional combination processing is instructed, the editing processing section 14 executes the additional combination processing (step S25).

The additional combination processing is explained with reference to FIGS. 4 to 6. FIGS. 5 and 6 show an example in which a display screen 32a of the display section 32 is disposed on one surface of the housing 1a.

In the additional combination processing, selected sound is additionally combined with a selected video or the selected video is additionally combined with the selected sound. Steps S51 to S59 in FIG. 4 indicate operations during moving image selection. Steps S61 to S69 indicate operations during sound selection. In steps S21 to S23 in FIG. 3 explained above, only the reproduction processing for an image is explained. However, it is also possible to enable a sound file to be selected in the file list indicator in step S21.

The upper left of FIG. 5 shows an example of the file list indicator in step S21. On the display screen 32a, thumbnail indicators 51 for selecting image files and selecting icon indicators 52 for selecting sound files are disposed on the display screen 32a. Note that marks or the like for distinguishing the image file and the sound file may be displayed. Further, on the display screen 32a, an editing button indicator 53 for performing normal editing such as deletion, an additional combination button indicator 54 on which "post-recording editing" is displayed for the additional combination processing, and a return button indicator 55 are displayed.

When the user touches the editing button indicator 53, the processing shifts from step S24 to step S26 in FIG. 3 and normal editing processing is performed. It is assumed that, after touching a predetermined thumbnail indicator 51 to select an image file, the user touches the additional combination button indicator 54. Then, the processing shifts to step S25 in FIG. 3 and the additional combination processing is started.

In the additional combination processing, in step S31 in FIG. 4, it is determined whether or not the selection of a moving image and sound ends. When the selection of both of a moving image and sound does not end, in step S51, it is determined whether or not an image file of a moving image is selected. When a moving image is selected, in step S52, content of the selected moving image is analyzed. That is, the image analyzing section 11 performs an image analysis of the selected moving image and gives an analysis result to the editing processing section 14. The editing processing section 14 arranges changes of images of the moving image in time series (step S53) and gives a result of the arrangement to the display control section 13. The display control section 13 displays, on the basis of these results, a representative image, which is a video event indicator, and a bar indicator and a time indicator corresponding to the representative image in an upper part of the screen (steps S54 to S56). Note that, when the user touches the return button indicator 55 in the upper left of FIG. 5, the processing shifts to step S58 and the moving image selection is released (step S59).

Further, the display control section 13 also displays an indicator for selecting a sound file to be additionally combined with the selected image file (step S57). The upper right of FIG. 5 shows a selection screen for the sound file.

In the present embodiment, as shown in the upper right of FIG. 5, in step S55, a video bar indicator 61 is displayed in an upper part of the display screen 32a. The video bar indicator 61 has length corresponding to time of the selected image file and indicates a time axis of the image file. On the display screen 32a, a video time indicator 63 indicating that the time of the selected image file is 3 minutes 10 seconds is also displayed (step S56).

The video bar indicator 61 has a break for each unit of respective frames or a plurality of frames in the image file. The determination result of the scene change is given to the display control section 13 from the image analyzing section 11 via the editing processing section 14. The display control section 13 displays, in portions of the video bar indicator 61 corresponding to frames of the scene change, indicators 64 different from the other portions as indicated by solid black in the upper right of FIG. 5. Further, the display control section 13 displays, in the vicinity of the video bar indicator 61 corresponding to times of the frames, as representative image indicators, thumbnail indicators 62 of the frames in the scene change positions (step S54). Note that the representative image indicators are not limited to the frames in the scene change positions. For example, a thumbnail indicator of a frame at every predetermined time interval may be used. These indicators make it easy to grasp, for example, a state of a change on a time axis of a selected video.

In a lower part of the display screen 32a, a plurality of selecting icon indicators 65 for selecting sound files are disposed (step S57). Below the respective selecting icon indicators 65, sound time indicators 66 indicating times of the sound files corresponding to the selecting icon indicators 65 are also displayed. For example, it is seen that a sound file indicated by "sound 2" is a sound file including sound, a reproduction time of which is 2 minutes 05 seconds.

It is assumed that the user touches and selects one of the selecting icon indicators 65 in the upper right of FIG. 5. Then, the processing shifts from steps S31, S51, and S61 to step S62 in FIG. 4 and analysis processing for the sound is executed (step S62). That is, the sound analyzing section 12 performs an analysis of the selected sound and gives an analysis result to the editing processing section 14. The editing processing section 14 arranges changes of the sound in time series (step S63) and gives a result of the arrangement to the display control section 13. The display control section 13 displays, on the basis of these results, representative sound indicators such as keyword indicators, which are sound event indicators, and bar indicators and time indicators corresponding to the representative sound indicators in a lower part of the screen (steps S64 to S66). The lower left of FIG. 5 shows screen display in this case.

In the present embodiment, as shown in the lower left of FIG. 5, in step S65, a sound bar indicator 71 is displayed in a lower part of the display screen 32a. The sound bar indicator 71 has length corresponding to time of the selected sound file and indicates a time axis of the sound file. In the present embodiment, length per unit time is set the same for the video bar indicator 61 and the sound bar indicator 71. Therefore, a relation on the time axes of the selected video and the selected sound is clarified by the video bar indicator 61 and the sound bar indicator 71.

The sound bar indicator 71 has a break, for example, in a change of sound in the sound file, in each predetermined time, or in each detection of a keyword. A determination result of the break is given to the display control section 13 from the sound analyzing section 12 via the editing processing section 14. The display control section 13 displays, in portions of the sound bar indicator 71, for example, immediately following breaks, indicators 72 different from the other portions as indicated by solid black in the lower left of FIG. 5. Further, the display control section 13 displays, in the vicinity of the sound bar indicator 71 corresponding to times of the breaks, as representative sound indicators, text indicators 73 indicating by text recognition results of sound in break positions (step S64). Note that the representative sound indicators are not limited to the break positions of the sound. For example, a text indicator of a sound recognition result at every predetermined time interval may be used. These indicators make it easy to grasp, for example, a state of a change on a time axis of selected sound. Note that, when the user touches a return button indicator 76 in the lower left of FIG. 5, the processing shifts to step S68 and the sound selection is released (step S69).

When the selection of a video (a moving image) and sound ends, the display control section 13 shifts the processing from step S31 to step S32 in FIG. 4 and displays an editing switch indicator 75. It is assumed that, as shown in the lower left of FIG. 5, the user touches the editing switch indicator 75 with a finger 79. The lower left of FIG. 5 indicates with a thick frame that the editing switch indicator 75 is operated. Consequently, the display control section 13 displays an editing screen shown in the lower right of FIG. 5 on the display screen 32*a* of the display section 32.

On the editing screen shown in the lower right of FIG. 5, an insertion button indicator 81, a selection button indicator 82, and a deletion button indicator 83 are displayed and an explanation indicator 77 "select by touch on a bar" is displayed. The user can perform position (editing point) setting, range setting, and adjustment work by touching, pinching, and sliding positions on the video bar indicator 61, the sound bar indicator 71, the thumbnail indicator 62, and the text indicator 73 of the touch operation section 31. The user can perform decision of a selection range, decision of a deletion range, and insertion of a selection range by touching positions on the insertion button indicator 81, the selection button indicator 82, and the deletion button indicator 83.

The editing processing section 14 detects touch operation in step S34 in FIG. 4, detects pinch operation in step S36, and detects slide operation in step S38. When detecting the touch operation, the editing processing section 14 stores time corresponding to a touch position. When detecting the pinch operation, the editing processing section 14 stores time corresponding to a pinch amount. When detecting the slide operation, the editing processing section 14 stores time corresponding to a slide amount.

For example, when the user touches any two positions on the sound bar indicator 71 in the lower right of FIG. 5, the editing processing section 14 determines that operation for designating a sound portion at time corresponding to a part between the two positions (editing points) in the recorded sound is performed. The upper left of FIG. 6 shows a state in which the user touches two positions on the sound bar indicator 71 with the finger 79. When the user touches the selection button indicator 82 as shown in the lower right of FIG. 5 in this state, the editing processing section 14 shifts the processing from step S41 to step S42 and decides a range of the designated sound portion. That is, according to these kinds of operation, processing for deciding a portion of sound to be inserted into a video is performed.

When the user touches the deletion button indicator 83 indicated by a thick frame in the upper left of FIG. 6, the editing processing section 14 shifts the processing from step S45 to step S46 and deletes the range of the designated sound portion. Note that the user may designate a range of a sound portion to be inserted into a video by touching the text indicator 73 concerning at least one of the range designations.

In this way, according to the touch operation on the sound bar indicator 71 and the text indicator 73 and the operation on the selection button indicator 82 and the deletion button indicator 83, the user can extremely easily decide a sound portion to be subjected to combination processing. In this case, time per unit length is the same on a time axis of the sound bar indicator 71 and a time axis of the video bar indicator 61. With the text indicator 73, it is relatively easy to recognize a kind of a sound portion, a range of which is about to be designated. Therefore, the user can easily determine a sound portion that should be selected in sound combination.

When the sound portion to be inserted is decided, the display control section 13 displays a sound bar indicator 85 of only the decided portion as shown in the upper right of FIG. 6. The display control section 13 also displays a decided sound time indicator 86 indicating time of the decided sound portion. An example shown in the upper right of FIG. 6 indicates that a sound portion for 56 seconds is decided.

After deciding the sound portion to be subjected to the combination processing, the user sets a portion of time of a video into which the decided sound portion is inserted. In this case, the user touches the video bar indicator 61 or the thumbnail indicator 62. Assuming that time corresponding to a touch position of the user is a leading position of time into which the sound is inserted, the editing processing section 14 stores the time as an insertion position (an insertion editing point). When the user touches the insertion button indicator 81 as indicated by a thick frame in the upper right of FIG. 6 in this state, the editing processing section 14 shifts the processing from step S43 to step S44 and inserts a range of an already decided sound portion into a designated insertion editing point of sound corresponding to an image file. In this way, the additional combination processing for the sound with the video is performed.

When the additional combination of the sound with the video is performed, the display control section 13 displays a fine adjustment screen shown in the lower left of FIG. 6. As shown in the lower left of FIG. 6, on the fine adjustment screen, indication "fine adjustment" indicates the fine adjustment screen. A decision button indicator 87 is displayed. The user can change an insertion position (time) of the sound into the video by performing slide operation on the video bar indicator 61 or the sound bar indicator 85. An arrow 89 in the lower left of FIG. 6 indicates that the user performs the slide operation on the sound bar indicator 85. When the slide operation is performed, the editing processing section 14 shifts from step S38 to step S39 and adjusts time of an insertion position of the sound into the video according to a slide amount.

An arrow 90 in the lower right of FIG. 6 indicates that the user performs the pinch operation on the video bar indicator 61 with the finger 79. When the pinch operation is performed, the editing processing section 14 shifts from step S36 to step S37 and adjusts a time axis of the video with respect to the sound according to a pinch amount. That is, the time axis of the video is extended or reduced according to the pinch amount. Therefore, in this case, a time portion where the pinch operation is performed is reproduced at high speed or low speed. Consequently, even when time of selected sound and a period of a video into which the time is desired to be inserted are different, it is possible to insert the selected sound portion into a desired reproduction position of the video. In this case, reproduction speeds of the video and the sound are different. For example, the sound is reproduced at normal speed in a state in which the video is reproduced at high speed.

Note that the display control section 13 displays time after the extension or the reduction. The pinch operation can be performed on both of the video bar indicator 61 and the sound bar indicator 85. It is possible to change the time axes of the video and the sound as appropriate. Further, it is also possible to perform the slide operation and the pinch operation before the sound is inserted into the video.

When the user performs the touch operation on the decision button indicator 87, the editing processing section 14 shifts the processing from step S47 to step S48, decides the additional combination processing based on operation by the user, and converts information obtained by combining the sound with the video into a file or a container. In this way, it is possible to perform post-recording processing for additionally combining sound selected by the user with the video selected by the user. In the next step S49, the control section 10 determines whether or not an end of the additional combination processing is instructed. When the additional combination processing ends, the control section 10 returns the processing to step S9 in FIG. 3. Note that, in FIGS. 5 and 6, the example is shown in which the video is selected first and the sound is selected later and combined with the video. However, it is evident that it is also possible to select the sound first and select the video later and combine the video with the sound.

As explained above, in the present embodiment, in the additional combination processing, the video bar indicator and the sound bar indicator indicating the time axes of the video and the sound are displayed. According to the operation on the video bar indicator and the sound bar indicator, a range of insertion, an insertion position, and the like are designated. The user can perform the additional combination processing with intuitive operation. Moreover, the lengths per unit time of the video bar indicator and the sound bar indicator are the same. The user can easily determine which portion of the sound or the video should be inserted into which position of the video or the sound. Further, in the positions of predetermined times of the video bar indicator and the sound bar indicator, for example, the positions of the scene change and the breaks of the sound, the thumbnail indicators of the video and the text indicators of the sound in the times are displayed. The user can easily determine an insertion position and a portion to be inserted. Further, in the present embodiment, the time axes of the video and the sound can be extended or reduced with simple operation on the video bar indicator and the sound bar indicator. It is possible to easily realize special reproduction such as high-speed reproduction and low-speed reproduction. In this way, the time axes in a common scale are displayed concerning the video and the sound. Consequently, the user can easily determine a range of the sound portion, an insertion position in the video, and the like and can intuitively perform adjustment of the time axes as well.

Note that, in the example shown in FIG. 4, the analysis processing for the image and the sound is performed when the moving image and the sound are selected in the additional combination processing. However, these analyses may be performed during recording or capturing of the image and the sound.

(Modification)

Figure 7:
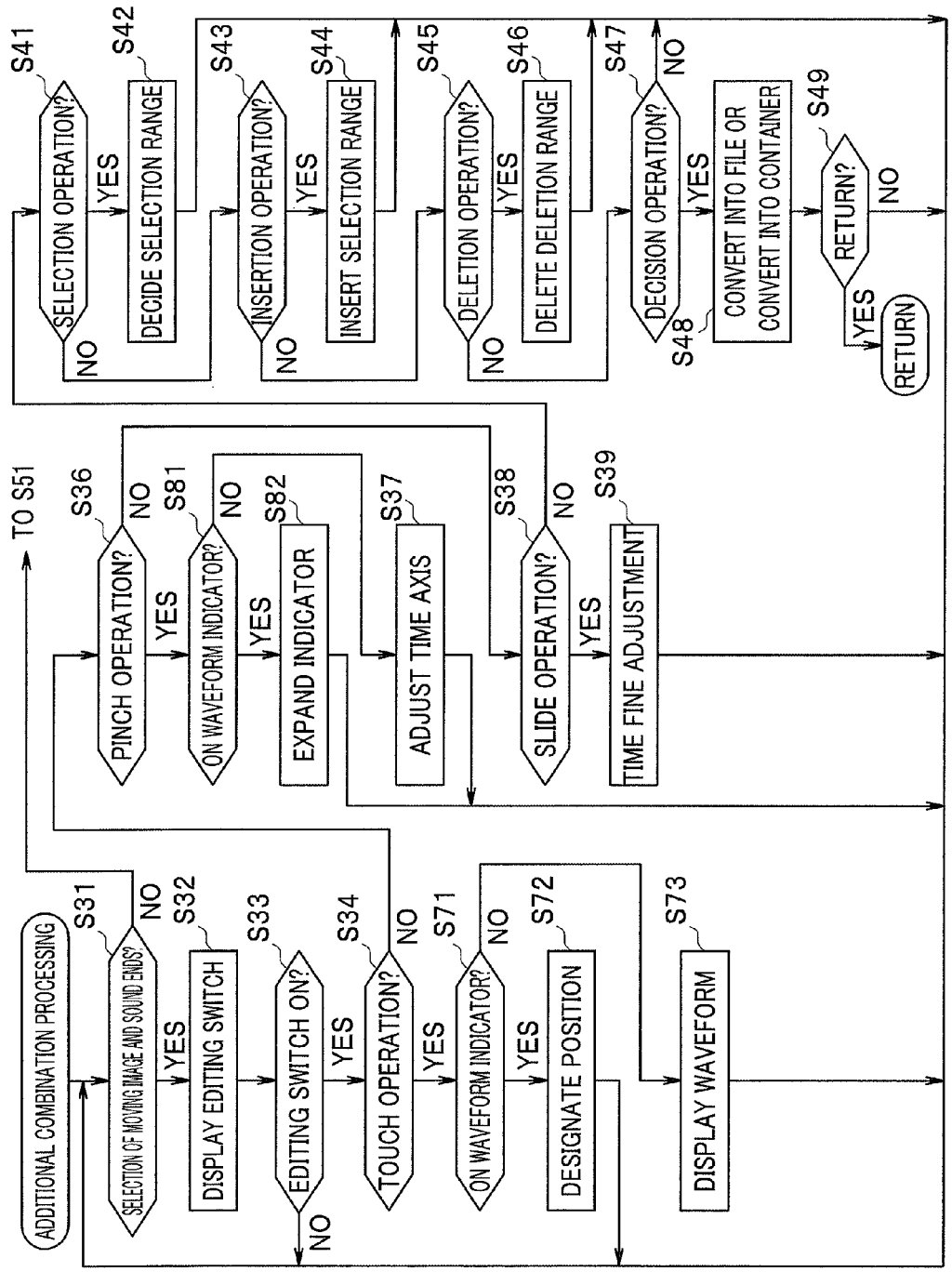
FIG. 7 is a flowchart for explaining a modification.

FIG. 7 is a flowchart for explaining a modification. In FIG. 7, procedures same as the procedures in FIG. 4 are denoted by the same signs and explanation of the procedures is omitted. Note that, in FIG. 7, steps S51 to S59 and steps S61 to S69 in FIG. 4 are not shown. FIGS. 8 and 9 are explanatory diagrams for explaining an additional combination processing screen in the modification. In FIGS. 8 and 9, components same as the components shown in FIGS. 5 and 6 are denoted by the same reference numerals and signs and explanation of the components is omitted.

In the example shown in FIG. 4 described above, the text indicator is displayed as the representative sound indicator serving as the sound event indicator. In this modification, a sound waveform is displayed as the representative sound indicator. Display examples in the upper left, the upper right, the lower left, and the lower right of FIG. 8 respectively correspond to the respective display examples in the upper left, the upper right, the lower left, and the lower right of FIG. 5. As shown in the lower left of FIG. 8, in this modification as well, the sound bar indicator 71 is displayed in the lower part of the display screen 32a. The time axes of the sound bar indicator 71 and the video bar indicator 61 have the same scale. A relation on the time axes between the video and the sound is clear.

In the sound bar indicator 71 in this modification, the indicators 72 (solid black portions) indicating the positions of the tags added by the tagging processing in step S13 in FIG. 3 are displayed. The display control section 13 displays, in the vicinity of the sound bar indicator 71 corresponding to the tag positions, tag number indicators 91 indicating numbers of the tags.

It is assumed that the user touches the editing switch indicator 75. The lower left of FIG. 8 indicates with a thick frame that the editing switch indicator 75 is operated. Consequently, the display control section 13 displays an editing screen shown in the lower right of FIG. 8 on the display screen 32a of the display section 32. Further, it is assumed that the user touches the sound bar indicator 71 on the editing screen shown in the lower right of FIG. 8. Then, the display control section 13 shifts the processing from step S34 to step S71 and determines whether or not a touch position is on the waveform indicator. In this case, since the touch position is on the sound bar indicator 71, the display control section 13 shifts to the next step S73, acquires a sound waveform, which is an analysis result of the sound analyzing section 12, from the editing processing section 14, and displays a waveform indicator 92 indicating the waveform (step S71 in FIG. 7). Note that the waveform indicator 92 indicates a waveform in a predetermined period in the vicinity of the touch position on the sound bar indicator 71 by the user. The same waveform indicator 92 can be displayed by touch operation on the tag number indicator 91 as well.

It is assumed that the user performs the pinch operation on the waveform indicator 92 in this state. An arrow 93 in the upper left of FIG. 9 indicates that the user performs the pinch operation on the waveform indicator 92 with the finger 79. When the pinch operation is performed, the editing processing section 14 shifts from step S36 to step S81 and determines whether or not the pinch operation is performed on the waveform indicator 92. In this case, since the pinch operation is performed on the waveform indicator 92, the display control section 13 shifts the processing to step S82 and expands (or reduces) the waveform indicator 92 according to a pinch amount. The upper left of FIG. 9 shows a waveform indicator 94 after the expansion. That is, the waveform indicator 94 is obtained by expanding a waveform in a period of the waveform indicator 92 in a time axis direction (the horizontal direction) to facilitate confirmation of the waveform.

Since the waveform indicator 94 is expanded, the user can easily designate an editing point. It is assumed that the user touches any position on the waveform indicator 94 in this state as shown in the upper right of FIG. 9. Then, the display control section 13 shifts the processing to step S72 via steps S34 and S71 and stores time corresponding to the touch position. The display control section 13 displays, on the waveform indicator, a point indicator indicating the touch position.

The lower left of FIG. 9 shows a state in which an editing point in another place is designated by the same method and a range is decided by the touch operation on the selection button indicator 82. On the display screen 32a, a waveform indicator 95a at a first point and a waveform indicator 95b at a second point are displayed. On the respective waveform indicators 95a and 95b, point indicators 96a and 96b indicating positions designated as the editing points by the user are displayed. In the sound bar indicator 71, an indicator 97 indicating that a sound period corresponding to a part between the point indicators 96a and 96b is selected is displayed.

As explained above, in this modification, it is possible to display the waveform as the representative sound indicator and cause the user to designate an editing point while viewing the waveform indicator. When music or the like is additionally combined as sound, an editing point is more easily set in the waveform indicator. It is possible to easily designate a sound portion to be additionally combined.

As explained above, in this modification, it is possible to set an editing point while viewing the waveform indicator. Therefore, the modification is excellent in operability.

Further, in the explanation in the embodiment of the present invention, the digital camera is used as the apparatus for photographing. However, the camera may be a digital single reflex camera or a compact digital camera or may be a camera for a moving image such as a video camera or a movie camera. Further, naturally, the camera may be a camera incorporated in, for example, a portable information terminal (PDA: personal digital assistant) such as a cellular phone or a smart phone. The camera may be an optical apparatus for industrial use or medical use such as an endoscope or a microscope.

The present invention is not limited to the embodiment per se. In an implementation stage, the constituent elements can be modified and embodied in a range not departing from the spirit of the present invention. Various inventions can be devised according to appropriate combinations of a plurality of constituent elements disclosed in the embodiment. For example, several constituent elements among all the constituent elements explained in the embodiment may be deleted.

Note that, even if the operation flows in the claims, the specification, and the drawings are explained using "first", "subsequently", and the like for convenience, this does not mean that it is essential to carry out the operation flows in this order. It goes without saying that the respective steps configuring the operation flows can be omitted as appropriate concerning portions not affecting the essence of the invention.

Among the techniques explained above, most of the controls and the functions mainly explained in the flowcharts can be set by a computer program. A computer can realize the controls and the functions described above by reading and executing the computer program. The entire or a part of the computer program can be recorded or stored as a computer program product in portable media such as a flexible disk, a CD-ROM or the like, and a nonvolatile memory and recording media such as a hard disk and a volatile memory. The computer program can be circulated or provided during product shipment or via a portable medium or a communication line. A user can easily realize the editing apparatus in the present embodiment by downloading the computer program via a communication network and installing the computer program in a computer or installing the computer program in the computer from a recording medium.

What is claimed is:

1. An editing apparatus comprising:
   an image analyzing processor that performs image analysis processing of recorded video to obtain a plurality of predetermined time units of the recorded video;
   a sound analyzing processor that performs sound analysis processing of recorded sound to obtain a plurality of predetermined time units of the recorded sound;
   and a display control processor that: displays, on a display, a video bar indicator corresponding to a reproduction time of the recorded video, the video bar indicator including at least one video unit break to visually indicate a length of each predetermined time unit of the recorded video, and displays, on the display, a sound bar indicator corresponding to a reproduction time of the recorded sound, the sound bar indicator including at least one sound unit break to visually indicate a length of each predetermined time unit of the recorded sound and at least one sound indicator displayed in a manner that indicates a state of change of the recorded sound;
   and an editing processor that: receives a selection operation corresponding to a selected range of video on the video bar indicator, and receives a selection operation corresponding to a selected range of sound on the sound bar indicator;
   adjusts a reproduction speed of the selected range of sound to have a time per unit length the same as the selected range of video, or adjusts a reproduction speed of the selected range of video to have a time unit length the same as the selected range of sound; and performs additional combination processing for inserting a video in a video period designated by the selected range of video into a sound period designated by the selected range of sound, or inserting sound in the sound period designated by the selected range of sound into the video period designated by the selected range of video;
   wherein the selected range of video and the selected range of sound are arranged and displayed on a same scale for synchronous reproduction.

2. The editing apparatus according to claim 1, wherein the display control processor displays, on the basis of the analysis result of the image analyzing processor, a video event indicator based on a video portion of a predetermined time of the recorded video in a vicinity of a reproduction position corresponding to the video event indicator in the video bar indicator and displays, on the basis of the analysis result of the sound analyzing processor, a sound event indicator based on a sound portion of a predetermined time of the recorded sound in a vicinity of a reproduction position corresponding to the sound event indicator in the sound bar indicator.

3. The editing apparatus according to claim 2, wherein the display control processor disposes the video event indicator in a direction orthogonal to a time axis direction of the video bar indicator and disposes the sound event indicator in a direction orthogonal to a time axis direction of the sound bar indicator.

4. The editing apparatus according to claim 1, wherein the display control processor disposes the video event indicator in a direction orthogonal to a time axis direction of the video bar indicator and disposes the sound event indicator in a direction orthogonal to a time axis direction of the sound bar indicator.

5. The editing apparatus according to claim 1, wherein the editing processor controls a time axis of the video corresponding to the video bar indicator and a time axis of the sound corresponding to the sound bar indicator.

6. The editing apparatus according to claim 1, wherein the editing processor receives touch operation, slide operation, or pinch operation on the sound event indicator.

7. The editing apparatus according to claim 1, wherein the sound indicator further comprises a text indicator.

8. The editing apparatus according to claim 1, wherein the video bar indicator further comprises at least one video indicator displayed in a manner that indicates a state of change of the recorded video.

9. An editing method comprising:
 analyzing a recorded video to obtain a plurality of predetermined time units of the recorded video;
 analyzing recorded sound to obtain a plurality of predetermined time units of the recorded sound; and
 displaying, on a display, a video bar indicator corresponding to a reproduction time of the recorded video, the video bar indicator including at least one video unit break to visually indicate a length of each predetermined time unit of the recorded video, and
 displaying, on the display, a sound bar indicator corresponding to a reproduction time of the recorded sound, the sound bar indicator including at least one sound unit break to visually indicate a length of each predetermined time unit of the recorded sound and at least one indicator displayed in a manner that indicates a state of change of the recorded sound;
 receiving a selection operation corresponding to a selected range of video on the video bar indicator,
 receiving a selection operation corresponding to a selected range of sound on the sound bar indicator;
 adjusting a reproduction speed of the selected range of sound to have a time per unit length the same as the selected range of video, or adjusts a reproduction speed of the selected range of video to have a time per unit length the same as the selected range of sound; and
 performing additional combination processing for inserting a video in a video period designated by the selected range of video into a sound period designated by the selected range of sound, or inserting sound in the sound period designated by the selected range of sound into the video period designated by the selected range of video;
 wherein the selected range of video and the selected range of sound are arranged and displayed on a same scale for synchronous reproduction.

10. The editing apparatus according to claim 2, wherein the editing processor controls a time axis of the video corresponding to the video bar indicator and a time axis of the sound corresponding to the sound bar indicator.

* * * * *